(12) United States Patent
Hu et al.

(10) Patent No.: US 10,578,928 B2
(45) Date of Patent: Mar. 3, 2020

(54) DISPLAY PANEL AND DISPLAY DEVICE

(71) Applicant: BOE TECHNOLOGY GROUP CO., LTD., Beijing (CN)

(72) Inventors: Yong Hu, Beijing (CN); Hongfei Cheng, Beijing (CN); Pan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/773,184

(22) PCT Filed: Sep. 28, 2017

(86) PCT No.: PCT/CN2017/103936
§ 371 (c)(1),
(2) Date: May 3, 2018

(87) PCT Pub. No.: WO2018/145474
PCT Pub. Date: Aug. 16, 2018

(65) Prior Publication Data
US 2019/0072793 A1 Mar. 7, 2019

(30) Foreign Application Priority Data
Feb. 10, 2017 (CN) ..................... 2017 2 0124124 U

(51) Int. Cl.
*G02F 1/1339* (2006.01)
*G02F 1/1333* (2006.01)
*G02F 1/1335* (2006.01)

(52) U.S. Cl.
CPC ...... *G02F 1/1339* (2013.01); *G02F 1/133308* (2013.01); *G02F 1/133553* (2013.01); *G02F 2202/28* (2013.01); *G02F 2203/02* (2013.01)

(58) Field of Classification Search
None
See application file for complete search history.

(56) References Cited

U.S. PATENT DOCUMENTS 6,284,087 B1   9/2001   Von Gutfeld et al.
9,507,214 B2   11/2016  Zhang
(Continued)

FOREIGN PATENT DOCUMENTS

CN    1302052 A    7/2001
CN    102508379 A  6/2012
(Continued)

OTHER PUBLICATIONS

Search Report for International Application No. PCT/CN2017/103936 dated Jan. 5, 2018.

*Primary Examiner* — Edward J Glick
*Assistant Examiner* — David Y Chung
(74) *Attorney, Agent, or Firm* — Calfee, Halter & Griswold LLP

(57) ABSTRACT

The disclosure discloses a display panel and a display device and relates to the technical field of display. The display panel includes an array substrate and an opposite substrate that are subjected to cell docking, and sealing material provided between the array substrate and the opposite substrate and located in a peripheral area of the display panel, wherein the display panel further includes an optical part provided on a side of the sealing material close to the array substrate and/or the opposite substrate and configured to guide ultraviolet light having passed through the sealing material back into the sealing material. The display panel is used to fabricate the display device.

16 Claims, 10 Drawing Sheets

(56) References Cited

U.S. PATENT DOCUMENTS

2012/0033150 A1\* 2/2012 Kim ..................... G02F 1/1339
                                                              349/43
2015/0355485 A1   12/2015 Zhang

FOREIGN PATENT DOCUMENTS

| CN | 102955298 A  | 3/2013  |
|----|--------------|---------|
| CN | 203259750 U  | 10/2013 |
| CN | 104035255 A  | 9/2014  |
| CN | 105116627 A  | 12/2015 |
| CN | 206440927 U  | 8/2017  |
| JP | 2014032352 A | 2/2014  |

\* cited by examiner

DISPLAY PANEL AND DISPLAY DEVICE

CROSS REFERENCE

The present disclosure claims priority to International Application Serial No. PCT/CN2017/103936, filed Sep. 28, 2017, which claims priority to Chinese Patent Application No. 201720124124.X, filed on Feb. 10, 2017 and titled "Display Panel and Display Device", and the entire contents thereof are incorporated herein by reference.

TECHNICAL FIELD

The present disclosure relates to the field of display technology, and in particular, to a display panel and a display device.

BACKGROUND

The display panel generally includes an array substrate and an opposite substrate. In order to bond the array substrate and the opposite substrate together, a frame sealant needs to be provided in the non-display area of the array substrate and/or the opposite substrate. The frame sealant is cured after cell docking so that the array substrate and the opposite substrate may be bonded together.

In the prior art, when ultraviolet light is used to cure the frame sealant, part of the frame sealant blocked by the metal leads in the peripheral area of the display panel is difficult to be cured due to the disadvantage of poor transmittance of the ultraviolet light. The insufficiently cured frame sealant may be in contact with the liquid crystal layer, causing impurities to appear in the liquid crystal. The impurities may affect the display effect of the display area, resulting in poor display of the liquid crystal display panel.

Typically, there is provided a retaining wall structure between the liquid crystal and the frame sealant to prevent the liquid crystal layer from prematurely contacting the uncured sealant. However, in the above bonding process, since the retaining wall structure cannot be bonded tightly to the array substrate and the opposing substrate, a gap is prone to exist between the retaining wall structure and the array substrate and the opposite substrate, so that the liquid crystal may easily pass through the above gap and contact the insufficiently cured sealant, causing impurities to be in the liquid crystal.

SUMMARY

The embodiments of the present disclosure adopt the following technical solutions:

In an aspect of the present disclosure there is provided a display panel including an array substrate and an opposite substrate that are subjected to cell docking, and sealing material provided between the array substrate and the opposite substrate and located in a peripheral area of the display panel, wherein the display panel further includes an optical part provided on a side of the sealing material close to the array substrate and/or the opposite substrate and configured to guide ultraviolet light having passed through the sealing material back into the sealing material.

In one embodiment, the optical part has a side contacting the sealing material which is an uneven reflection surface and by which the ultraviolet light having passed through the sealing material is reflected back into the sealing material.

In one embodiment, the reflective surface of the optical part is a diffusely reflective surface.

In one embodiment, the optical part is provided on a side of the sealing material close to the array substrate, and the array substrate includes a plurality of intercrossing metal leads in the peripheral area which define a plurality of gap areas. The optical part includes a first reflection portion which is formed by the metal leads, and a which is provided between the first reflection portion and the sealing material, the first refraction portion has a first surface with unevenness at a side close to the sealing material, in a position corresponding to the gap areas.

In one embodiment, the display panel also includes a first insulating layer between the array substrate and the sealing material, and at least part of the first insulating layer forms the first reflection portion.

In one embodiment, the array substrate includes a gate line insulating layer and a data line insulating layer, and the first reflection portion is provided in the same layer as the gate line insulating layer or the data line insulating layer.

In one embodiment, the first reflection portion includes a plurality of intercrossing refractive strips which have overlapping positions corresponding to at least part of the gap areas; or the first reflection portion includes a plurality of spaced refraction blocks which have positions corresponding to at least part of the gap areas.

In one embodiment, the optical part is provided at a side of the sealing material close to the opposite substrate, the optical part includes a second reflection portion the second reflection portion has an uneven surface close to the sealing material and/or the second insulating layer has an uneven surface close to the sealing material, and the ultraviolet light having passed through the sealing material is reflected back into the sealing material by the second reflection portion.

In one embodiment, the second insulating layer has a surface close to the sealing material which is a diffusely reflective surface.

In one embodiment, a second insulating layer is provided between the second reflection portion and the sealing material.

In one embodiment, the material forming the second reflection portion includes a metal material.

In one embodiment, the optical part is provided on both a side of the sealing material close to the array substrate and a side of the sealing material close to the opposite substrate. The optical part includes a first reflection portion provided on a side of the array substrate close to the sealing material and a second reflection portion provided on a side of the opposite substrate close to the sealing material. The first reflection portion includes a plurality of intercrossing first reflective strips. The second reflection portion includes a plurality of intercrossing second reflective strips which define a plurality of gap areas. The plurality of first reflective strips have overlapping positions, at least part of which corresponds to at least one gap area defined by the second reflective strips.

In one embodiment, the display panel includes a display area surrounded by the peripheral area. The opposite substrate includes a black matrix. The black matrix at the peripheral area and at a position corresponding to the seal material has a gap defining area. A distance between an end of the gap defining area close to the display area and the display area is greater than or equal to a predetermined distance. Here, the predetermined distance is in range of 30%-35% of width of the sealing material. The black matrix in the gap defining region is in a grid shape. The black matrix has light transmitting areas corresponding to the gap areas of the second reflection portion.

In another aspect of the present disclosure there is provided a display device including the display panel described in the present disclosure.

An embodiment of the present disclosure provides a display panel and a display device. The display panel includes an array substrate and an opposite substrate which are subjected to cell docking, and is provided with sealing material between the array substrate and the opposite substrate at a peripheral area of the display panel. The display panel further includes an optical part provided on a side of the sealing material close to and/or opposite to the array substrate and configured to guide ultraviolet light having passed through the sealing material back into the sealing material again.

The above and other objects, features, and advantages of the present disclosure will become more apparent from the following description of the preferred embodiments with reference to the accompanying drawings.

DETAILED DESCRIPTION

Figure 1:
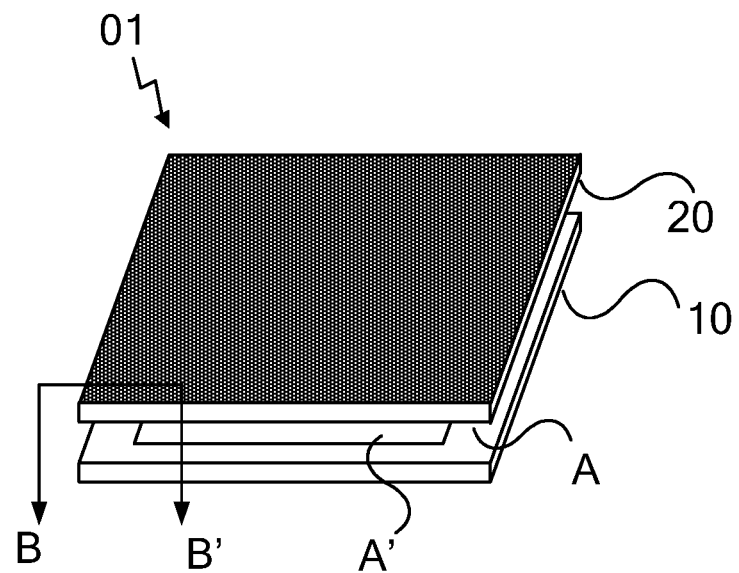
FIG. 1 is a schematic structural view of a display panel according to an embodiment of the present disclosure.

Now more complete description will be made to exemplary embodiments with reference to the accompanying drawings. However, the exemplary embodiments may be implemented in various ways and should not be construed as limited to the embodiments set forth herein; rather, these embodiments are provided to make the present disclosure full and complete, and convey the concept of the exemplary embodiments in its entirety to those skilled in the art. Like reference numerals through the drawings denote the same or similar structures, and thus their detailed description will be omitted.

Hereinafter, the technical solutions in the embodiments of the present disclosure will be clearly and fully described with reference to the accompanying drawings in the embodiments of the present disclosure. It is obvious that the described embodiments are merely part, but not all, of the embodiments of the present disclosure. All other embodiments obtained by those skilled in the art based on the embodiments of the present disclosure without creative efforts shall fall within the protection scope of the present disclosure.

Figure 2:
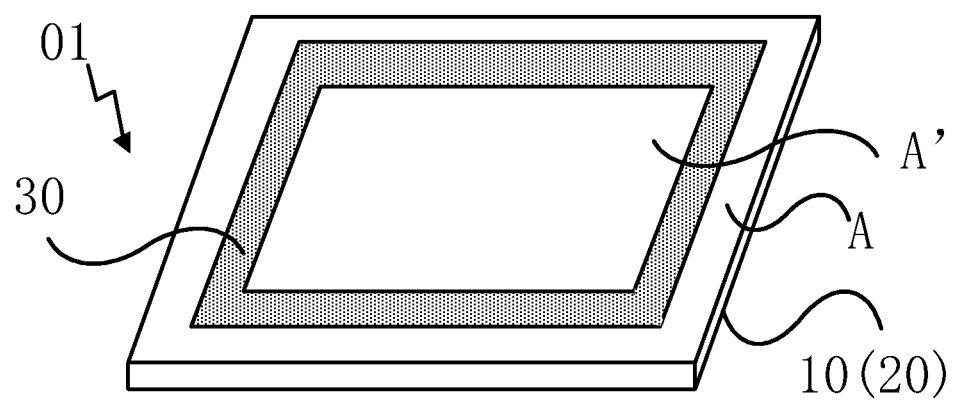
FIG. 2 is a schematic view of an array substrate or an opposite substrate of the display panel shown in FIG. 1.

An embodiment of the present disclosure provides a display panel 01 as shown in FIG. 1. The display panel 01 includes an array substrate 10 and an opposite substrate 20 which are subjected to cell docking, and is provided with sealing material 30 as shown in FIG. 2 between the array substrate 10 and the opposite substrate 20 in a peripheral area A of the display panel 01. The peripheral area A of the display panel 01 surrounds a display area A'.

It should be noted that the sealing material 30 includes a photosensitive component such that the sealing material 30 may be cured by ultraviolet light. For example, the sealing material 30 is a frame sealant.

Figure 3A:
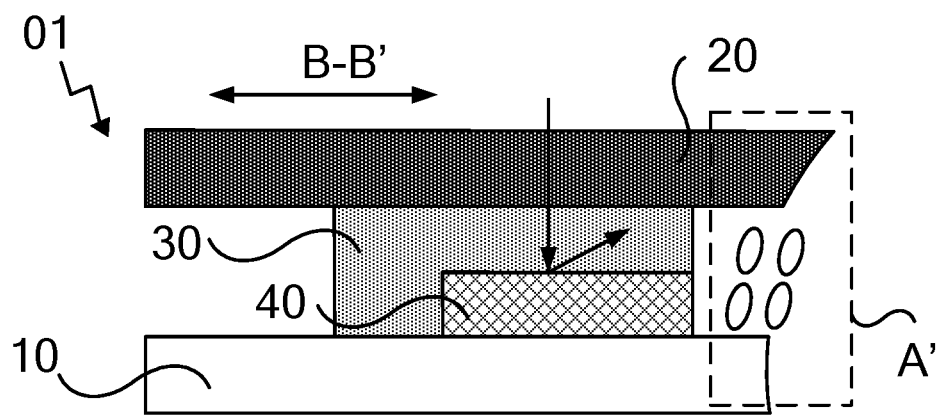
FIGS. 3A-3C are partial sectional views of the display panel of FIG. 1 taken along line B-B'.
Figure 3B:
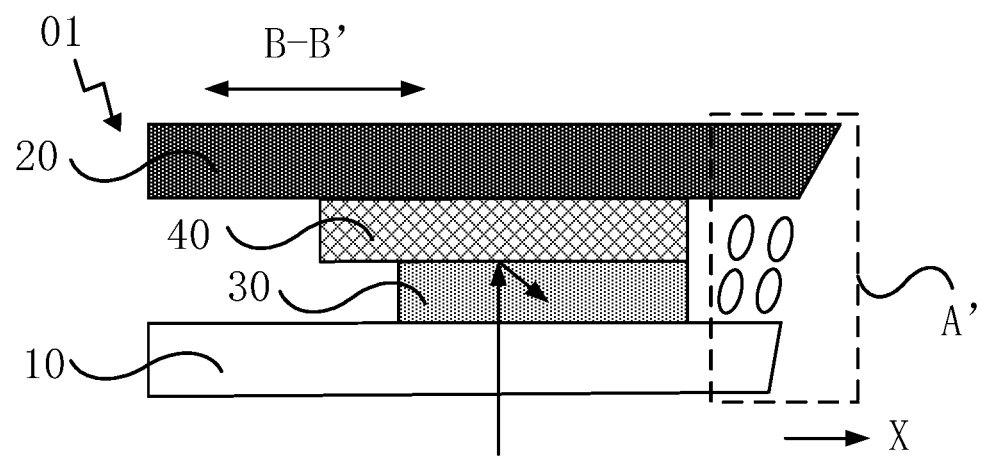
Figure 3C:
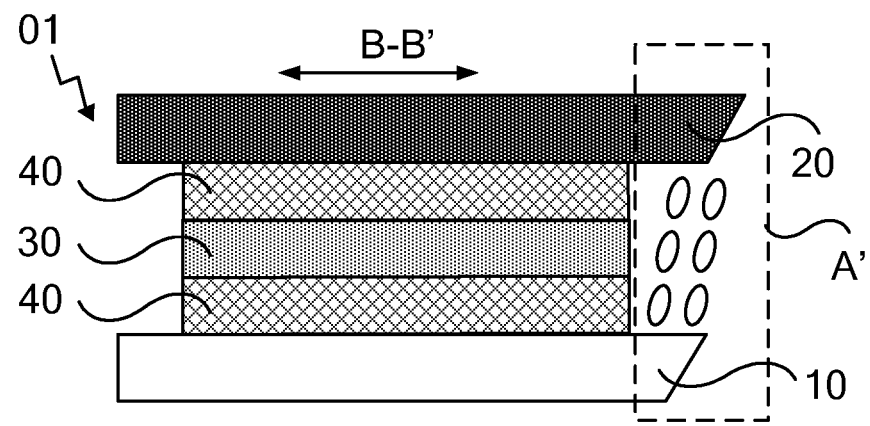

Based thereon, the display panel 01 further includes an optical part 40 as shown in FIGS. 3A-3C. The optical part 40 may be provided on a side of the sealing material 30 close to the array substrate 10 as shown in FIG. 3A; or as shown in FIG. 3B, the optical part 40 may be provided on a side of the sealing material 30 close to the opposing substrate 20; or as shown in FIG. 3C, the optical part 40 may be provided on both the side of the sealing material 30 close to the array substrate 10 and the side of the sealing material 30 close to the opposing substrate 20. Here, the optical part 40 may reflect the ultraviolet light having passed through the sealing material 30 back into the sealing material 30.

On this basis, the array substrate 10 and the opposite substrate 20 are subjected to cell docking, and the sealing material 30 located in the peripheral area A is cured with ultraviolet light such that when the array substrate 10 and the opposite substrate 20 are bonded together, the optical part 40 on the side of the sealing material 30 close to and/or opposite to the array substrate 10 reflects the ultraviolet light having passed through the sealing material 30 back into the sealing material 30, thereby increasing the ultraviolet light incident on the sealing material 30 and in turn increasing the curing efficiency of the sealing material 30. In this way, since the curing efficiency of the sealing material 30 is improved, the probability of impurities occurring in the liquid crystal when the uncured sealing material 30 comes into contact with the liquid crystal layer may be reduced, thereby improving the display effect of the display panel. 01. In addition, since the curing efficiency of the sealing material 30 is improved, when the retaining wall structure is provided, the probability that the insufficiently cured sealing material 30 is in contact with the liquid crystal layer may be reduced.

When the sealing material 30 is cured, the ultraviolet light illumination is used to enable a curing reaction of the photosensitive component in the sealing material 30.

When the optical part 40 corresponds to part of the sealing material 30 as shown in FIG. 3A, the optical part 40 may reflect the ultraviolet light having passed through the position opposite to the sealing material 30 back to other part of the sealing material 30. When part of the sealing material 30 not provided with the optical part 40 is cured with heat from the ultraviolet light illumination, the curing efficiency is low. On this basis, in order to further improve the curing efficiency of the ultraviolet light for the sealing material 30, it is preferable that, as shown in FIG. 3B, the optical part 40 covers the sealing material 30, and in the X direction, has a length greater than or equal to that of the sealing material 30.

In this case, the optical part 40 may reflect most of the ultraviolet light having passed through the sealing material 30 back into the sealing material 30 to further increase the amount of ultraviolet light reflected back into the sealing material 30.

Now, detailed illustration by way of examples will be made to the specific positions and structures of the optical part 40 in conjunction with specific embodiments.

In an exemplary embodiment, the optical part 40 is provided on the side of the sealing material 30 close to the array substrate 10.

Figure 4:
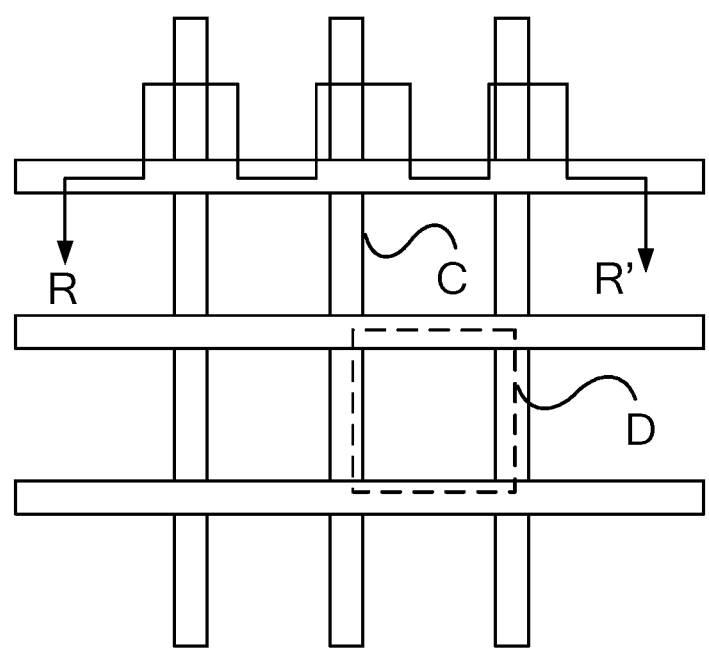
FIG. 4 is a schematic view of metal leads in the array substrate shown in FIG. 1.

Specifically, as shown in FIG. 4, the array substrate 10 includes a plurality of intercrossing metal leads C in the peripheral region A which define a plurality of gap areas D.

Figure 5:
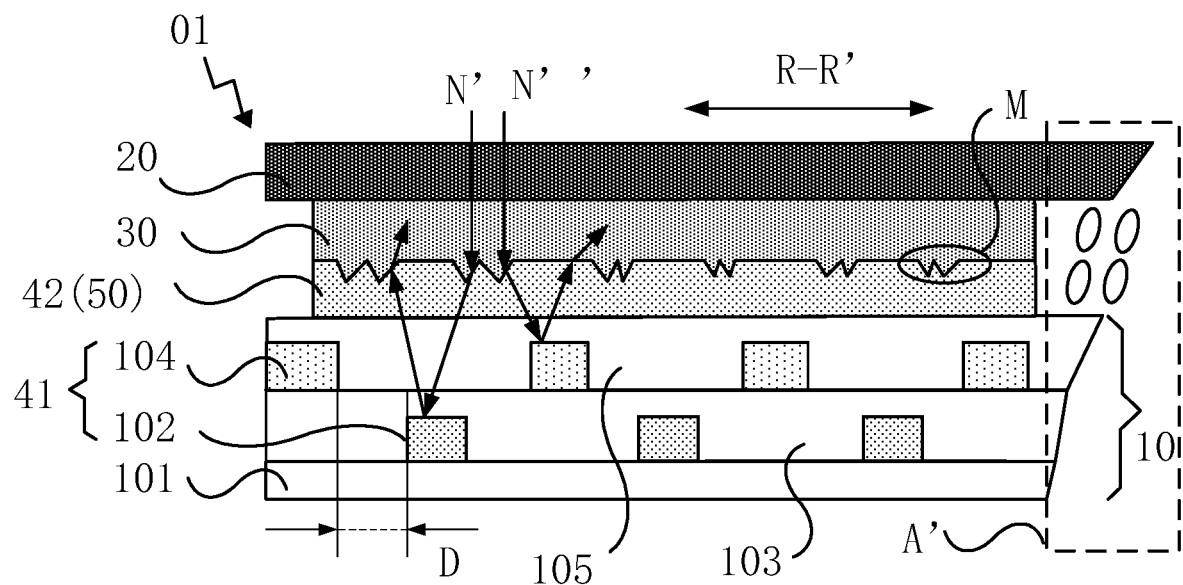
FIG. 5 is a sectional view taken along line R-R' in FIG. 4.

It should be noted that in order to avoid short circuit caused by contact of the plurality of metal leads C, any two intercrossing metal leads C are not in the same layer. For example, as shown in FIG. 5, which is a partial sectional view taken along the line R-R' in FIG. 4, the array substrate 10 includes a base substrate 101, a first metal lead 102, a gate line insulating layer 103, a second metal lead 104 and a data line insulating layer 105 which are sequentially provided. The first metal lead 102 and the second metal lead 104 form the above-described plurality of metal leads C. Here, the first metal lead 102 away from the opposite substrate 20 is in the same layer and has the same material as the gate line, and the second metal lead 104 close to the opposite substrate 20 is in the same layer and has the same material as the data line.

On this basis, as shown in FIG. 5, the metal leads C, i.e., the first metal lead 102 and the second metal lead 104, may be used as the first reflection portion 41 of the optical part 40. The optical part 40 further includes a first refraction portion 42 provided between the first reflection portion 41 and the sealing material 30. The first refraction portion 42 is at a position corresponding to the gap areas D and has an uneven surface M at a side close to the sealing material 30.

On this basis, as shown in FIG. 5, when the sealing material 30 is cured with the ultraviolet light, the ultraviolet light is incident from the side of the opposite substrate 20. As shown in FIG. 5, the ultraviolet light enters from the side of the opposite substrate 20 first cures the sealing material 30, passes through the sealing material 30, and is incident on the first surface M of the first refraction portion 42. Since the first surface M is uneven, the inclination angles of the sidewalls of the protrusions (or recessions) are different at different positions of the first surface M. Therefore, according to the principle of refraction, the ultraviolet light, after having been refracted at different positions of the first surface M, will emerge and strike different positions of the first reflection portion 41. For example, the ultraviolet light N' is refracted by the first refraction portion 42 towards the first metal lead 102, and the ultraviolet light N" is refracted by the first refraction portion 42 towards the second metal lead 104. Then, the ultraviolet light refracted to the metal leads C is reflected by the metal leads C back to the sealing material 30.

Now, a specific illustration by way of example will be made to how the first refraction portion 42 is configured. For example, as shown in FIG. 5, the first refraction portion 42 may be a newly added first insulating layer 50. Specifically, the first insulating layer 50 is located between the array substrate 10 and the sealing material 30, and at least part of the first insulating layer 50 forms the first refraction portion 42. Here, the material forming the first insulating layer 50 may be silicon nitride, silicon oxide, silicon oxynitride, or the like.

Figure 6A:
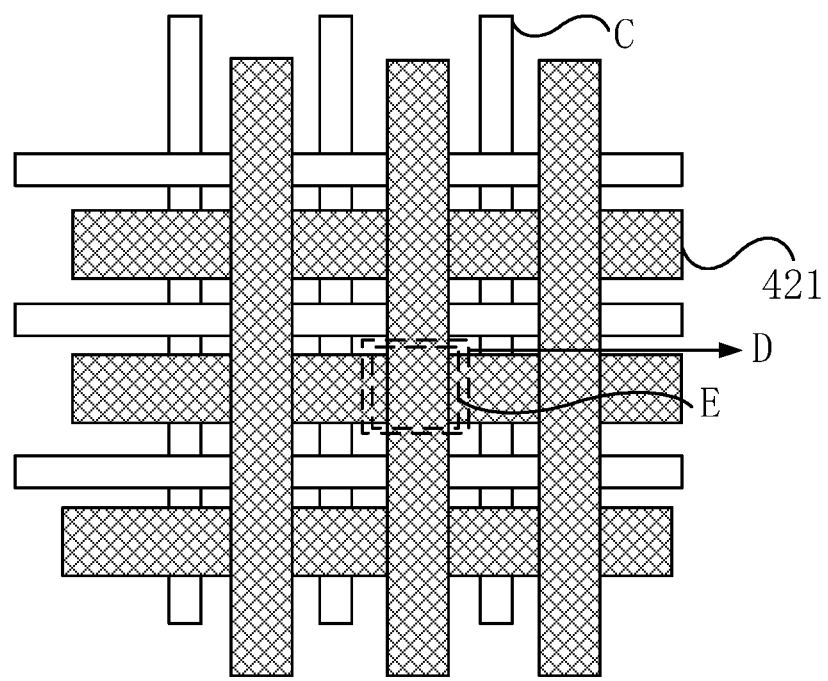
FIGS. 6A-6B are two schematic structural views of a first refraction portion provided by an embodiment of the present disclosure.

On this basis, the first refraction portion 42 may include a plurality of intercrossing refracting strips 421 as shown in FIG. 6A, which have overlapping positions E corresponding to the positions of at least part of the gap areas D.

It should be noted that the method for forming the plurality of refraction bars 421 may be: forming a refraction layer on the surface of the array substrate 10, and then forming a plurality of intercrossing refraction strips 421 through one patterning process, alternatively, forming a refraction layer on the surface of the array substrate 10, and forming laterally arranged refraction strips 421 by one patterning process; then, forming a second refraction layer on the surface of the refraction strips 421, and forming longitudinally arranged refraction strips 421 by one patterning process. Here, the intercrossing refraction strips 421 have overlapping positions corresponding to the positions of at least part of the gap areas D defined by the metal leads C.

Figure 6B:
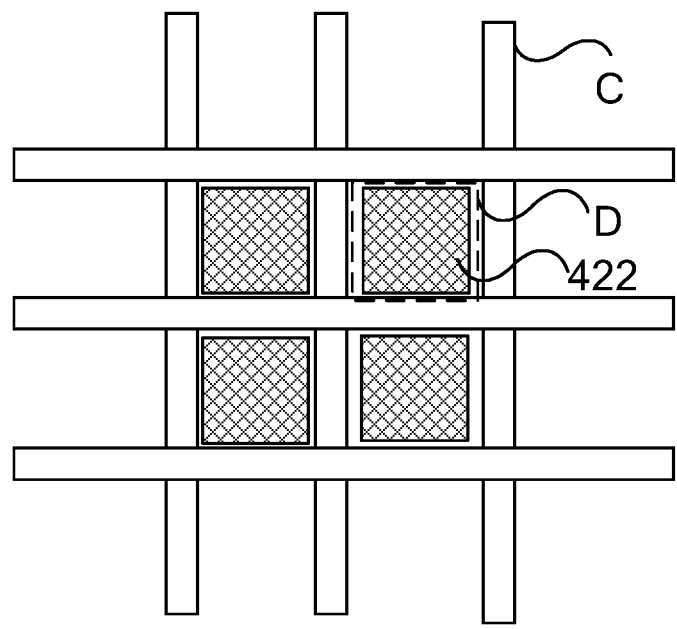

Alternatively, as shown in FIG. 6B, the first refraction portion 42 may include a plurality of spaced refraction blocks 422 which have positions corresponding to the positions of at least part of the gap areas D. In this case, since the refraction blocks 422 are provided at the positions of the gap areas D, the first refraction portion 42 does not refract the ultraviolet light which would otherwise be incident on the metal leads C, thereby reducing the probability that the first refraction portion 42 refracts the ultraviolet light which would otherwise be incident on the metal leads C to the gap areas D.

It should be noted that the method for forming the above-mentioned refraction block 422 may be: forming a refraction layer on the surface of the array substrate 10, and then forming a plurality of spaced refraction blocks 422 by one patterning process. Here, the positions of the refraction blocks 422 correspond to the positions of the gap areas D defined by at least part of the metal leads C.

Of course, the above is only an illustration of the configuration of the first refraction portion 42, and other configurations of the first refraction portion 42 will not be described one by one.

Figure 7A:
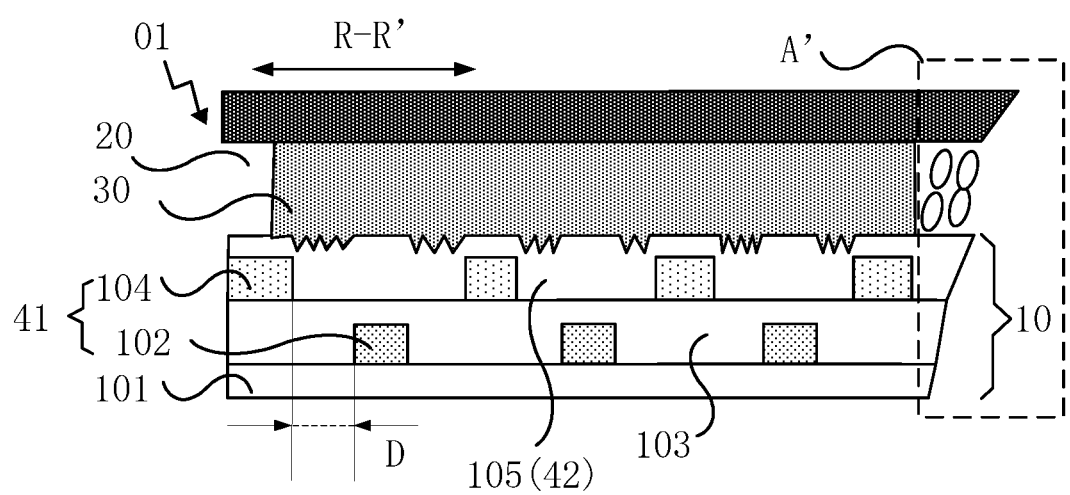
FIGS. 7A-7B are another two sectional views of the display panel shown in FIG. 1.
Figure 7B:
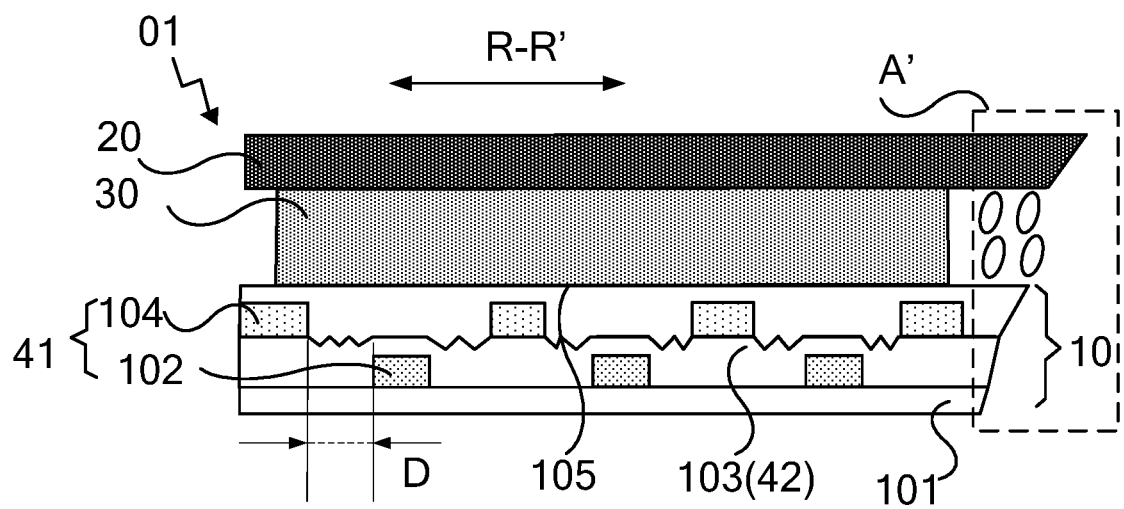

Alternatively, the first refraction portion 42 may be formed by the original film layer in the array substrate 10. Specifically, the array substrate 10 includes a gate line insulating layer 103 and a data line insulating layer 105. The first refraction portion 42 may be provided in the same layer as the data line insulating layer 105 as shown in FIG. 7A, or the first refraction portion 42 may be provided in the same layer as the gate line insulating layer 103 as shown in FIG. 7B. As such, since the first refraction portion 42 is provided in the same layer as the gate line insulating layer 103 or the data line insulating layer 105, there is no need to add a new film layer to form the first refraction portion 42, thereby simplifying the manufacturing process of the display panel 01 and avoiding the problem that new addition of the first insulating layer 50 may increase the manufacturing cost of the display panel 01.

In an exemplary embodiment, the optical part 40 is provided on the side of the sealing material 30 close to the counter substrate 20.

Figure 8:
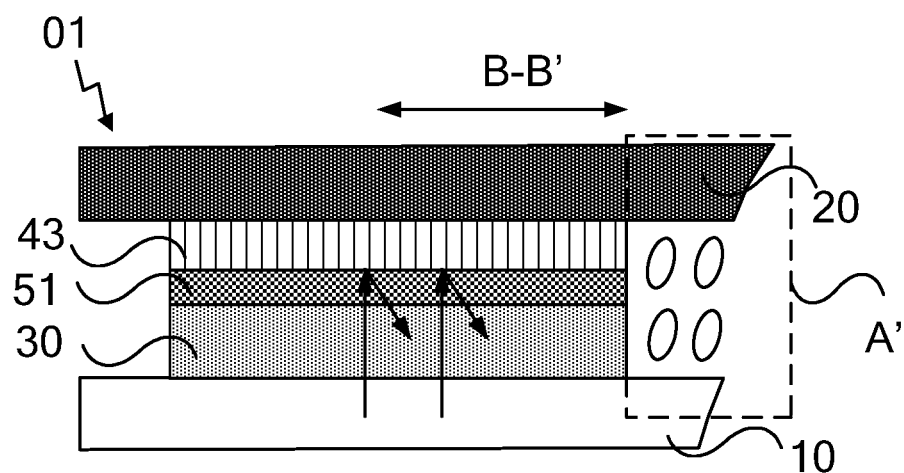
FIG. 8 is another sectional view of the display panel shown in FIG. 1.

Specifically, as shown in FIG. 8, the optical part 40 includes a second reflection portion 43, and the material forming the second reflection portion 43 includes a metal material.

In this case, when the sealing material 30 is cured with the ultraviolet light, the ultraviolet light enters from the side of the array substrate 10. As shown in FIG. 8, the incident ultraviolet light first cures the sealing material 30, is incident on the second reflection portion 43 after passing through the sealing material 30, and is reflected by the second reflection portion 43 having passed through the sealing material 30 back into the sealing material 30, thereby improving the curing efficiency of the sealing material 30.

It should be noted that, in order to improve the reflection effect of the second reflection portion 43 on the ultraviolet light having passed through the sealing material 30, it is preferable that the metal material forming the second reflection portion 43 is at least one of metallic aluminum or metallic silver. Since the metal aluminum or silver has a high reflectance, the reflection effect of the second reflection portion 43 on the ultraviolet light may be improved, thereby increasing the amount of ultraviolet light in the sealing material 30.

On this basis, when the second reflection portion 43 is in direct contact with the sealing material 30 or the opposing substrate 20, the metallic material in the second reflection portion 43 may affect the performance of the display panel 01. In order to avoid this case, a second insulating layer 51 as shown in FIG. 8 is provided between the second reflection portion 43 and the sealing material 30. Here, the material forming the second insulating layer 51 is the same as the material forming the first insulating layer 50, which will not be described here.

On this basis, in order to further reduce the curing time of the sealing material 30, the ultraviolet light reflected back to the sealing material 30 may be scattered during curing such that the ultraviolet light reflected back to the sealing material 30 may evenly illuminate and cure the sealing material 30, thereby further reducing the curing time of the sealing material 30.

Now, examples will be given to illustrate in conjunction with different structures of the second reflection portion 43 how the ultraviolet light having passed through the sealing material 30 is scattered into the sealing material 30.

Figure 9A:
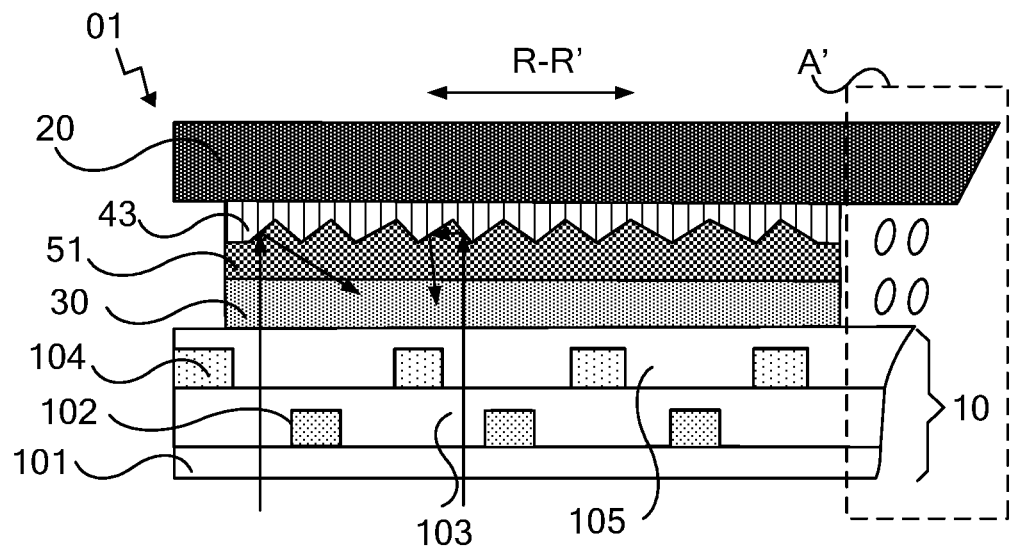
FIGS. 9A-9C are another three sectional views of the display panel shown in FIG. 1.

For example, as shown in FIG. 9A, the surface of the second reflection portion 43 close to the sealing material 30 is uneven. In this case, the ultraviolet light passes through the sealing material 30 and is incident on the second reflection portion 43. Because of the uneven surface of the second reflection portion 43, the ultraviolet light incident on the second reflection portion 43 is diffusely reflected. Because of various angles of the ultraviolet light reflected by the second reflection portion 43, the ultraviolet light reflected back into the sealing material 30 may uniformly illuminate the sealing material 30.

Figure 9B:
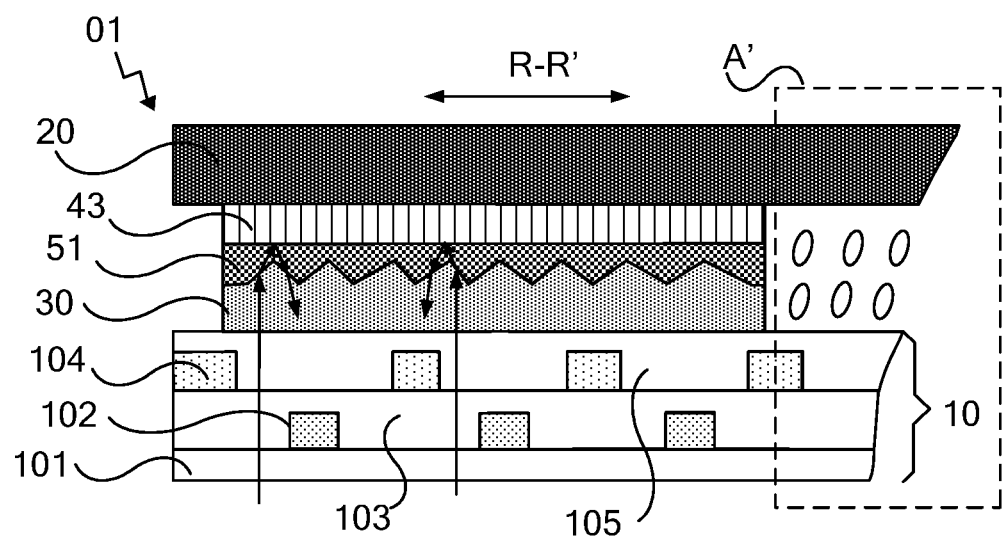

Alternatively, for example, as shown in FIG. 9B, the surface of the second insulating layer 51 close to the sealing material 30 is uneven. In this case, the ultraviolet light passes through the sealing material 30 and is incident on the second insulating layer 51. Because of the uneven surface of the second insulating layer 51 close to the sealing material 30, the inclination angles of the side walls of the protrusions or recesses at different positions are different. Accordingly, the ultraviolet light having been reflected by the second reflection portion 43 and exited are scattered by the uneven surface such that the ultraviolet light reflected back into the sealing material 30 may uniformly illuminate the sealing material 30.

Figure 9C:
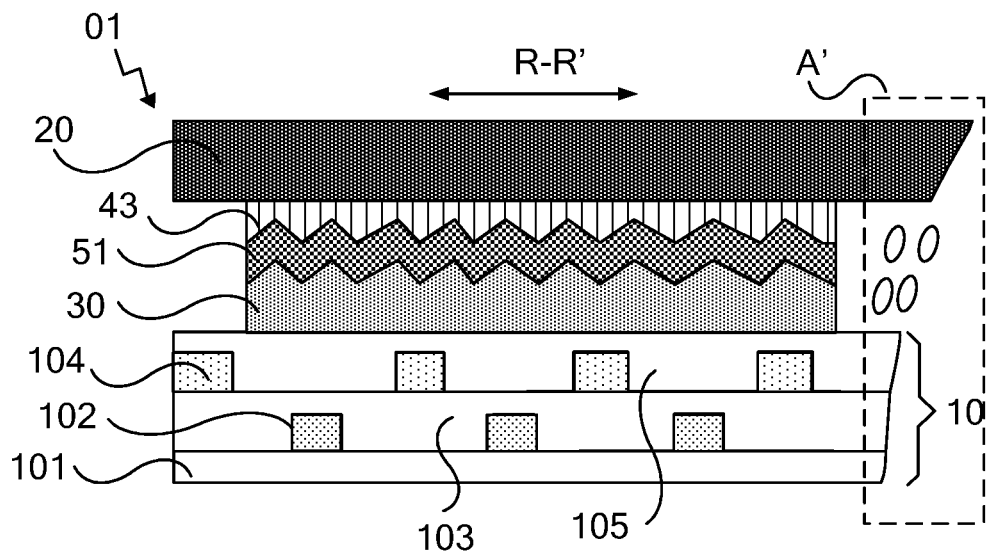

Further alternatively, for example, as shown in FIG. 9C, the surface of the second reflection portion 43 close to the sealing material 30 and the surface of the second insulating layer 51 close to the sealing material 30 are uneven. In this case, the principle of improving the curing efficiency of the sealing material 30 by the second reflection portion 43 and the second insulating layer 51 is similar to that of the surface of the second reflection portion 43 close to the sealing material 30 or that of the surface of the second insulating layer 51 close to the sealing material 30. Since principles have been described in detail before, they will not be repeated here.

It should be noted that, in the exemplary embodiments, in order to reduce the influence of the uneven surface described above on the application of the sealing material 30, the uneven surface described above includes micro-protrusion structures and micro-recession structures.

Figure 10A:
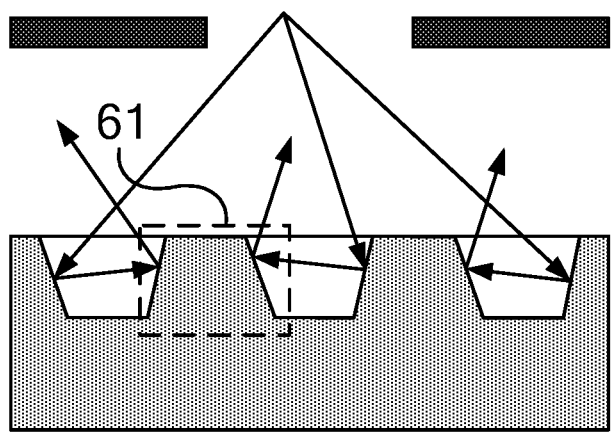
FIGS. 10A-10B are schematic views of longitudinal sectional shapes of a micro-protruded or micro-recessed structure provided by an embodiment of the present disclosure.
Figure 10B:
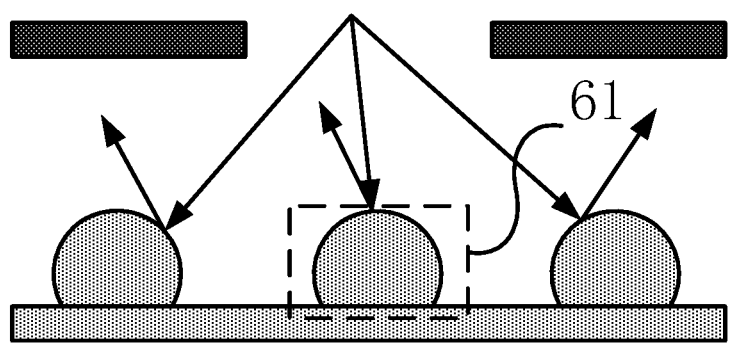

In addition, the longitudinal sectional shape of the micro-protrusion structure or the micro-recess structure forming the uneven surface may be a triangle as shown in FIG. 5 or FIG. 9A; or, as shown in FIG. 10A, the longitudinal sectional shape of the micro-protrusion structure 61 (or the micro-recess structure) is trapezoidal; or, as shown in FIG. 10B, the longitudinal sectional shape of the micro-protrusion structure 61 (or the micro-recess structure) is an arc shape. Here, the longitudinal section described above is perpendicular to the base substrate 101. Of course, the longitudinal sectional shapes shown above are only a few examples, and the disclosure will not list other shapes of the longitudinal section.

In the exemplary embodiments, both the sides of the sealing material 30 close to the array substrate 10 and the side of the sealing material 30 close to the opposing substrate 20 are provided with an optical part 40.

Figure 11:
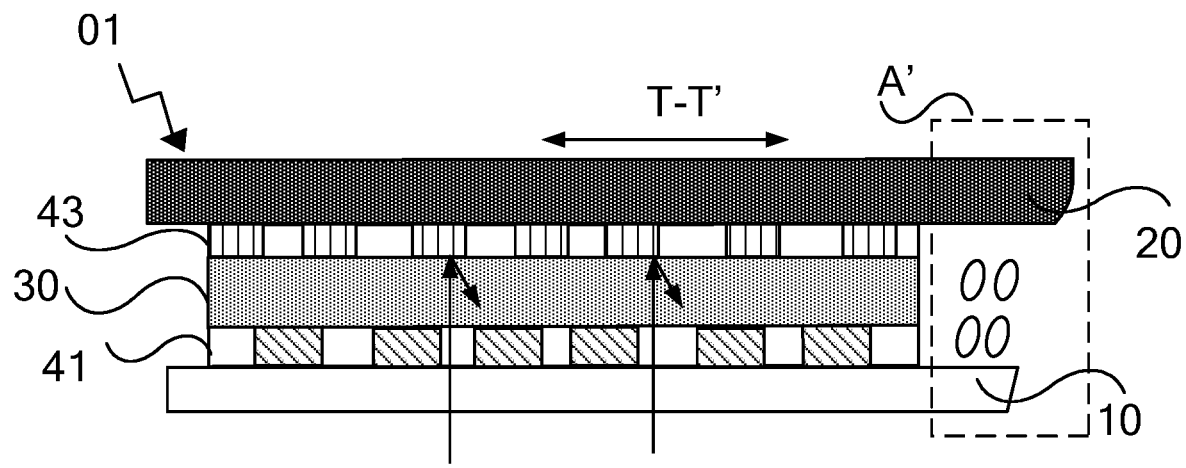
FIG. 11 is another sectional view of the display panel shown in FIG. 1.

Specifically, as shown in FIG. 11, the optical part 40 includes a first reflection portion 41 provided on a side of the sealing material 30 close to the array substrate 10 and a second reflection portion provided on a side of the sealing material 30 close to the opposite substrate 20.

Figure 12:
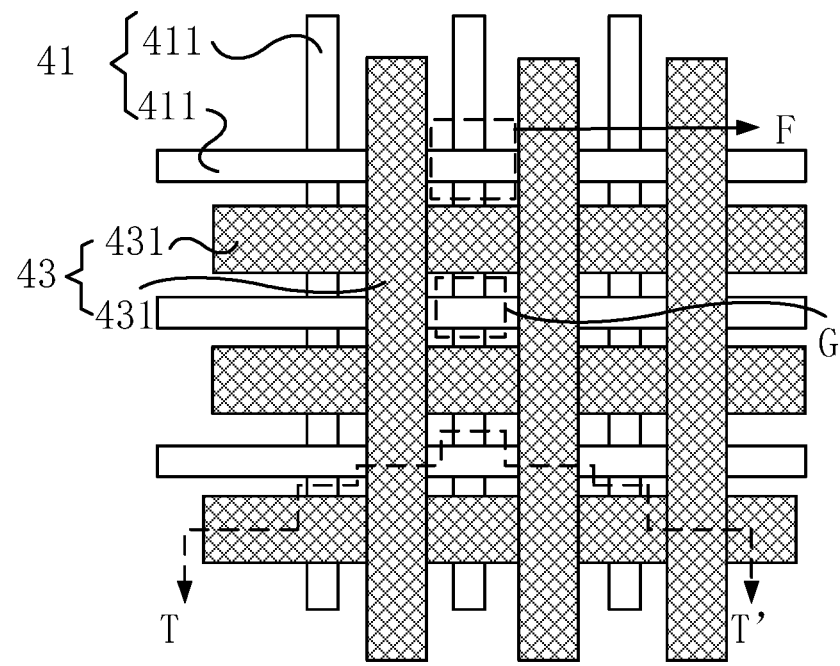
FIG. 12 is a schematic structural view of a first reflection portion and a second reflection portion according to an embodiment of the present disclosure.

Here, as shown in FIG. 12, the first reflection portion 41 includes a plurality of intercrossing first reflective stripes 411. The second reflection portion 43 includes a plurality of intercrossing second reflective stripes 431. The plurality of second reflective stripes 431 define a plurality of gap areas G At least part of the overlapping positions F of the plurality of first reflective stripes 411 corresponds to at least one gap area G defined by the intersection of the plurality of second reflective stripes 431.

In this case, when the sealing material 30 is cured with the ultraviolet light, the ultraviolet light may enter from both the side of the array substrate 10 and the side of the opposite substrate 20. As shown in FIG. 11, when the ultraviolet light enters from the side of the array substrate 10, the ultraviolet light is incident on the sealing material 30 after having passed through the gap positions defined by the first intercrossing multiple reflective strips 411. Since at least part of the overlapping positions F of the plurality of first reflective strips 411 corresponds to at least one gap area G defined by the intersection of the plurality of second reflective strips 431, the ultraviolet light is incident on the second reflective strips 431 after having passed through the sealing material 30. The second reflective strip 431 reflects the ultraviolet light to reflect the ultraviolet light having passed through the sealing material 30 back to the sealing material 30, thereby improving the curing efficiency of the sealing material 30. When the ultraviolet light enters from the side of the opposite substrate 20, the curing process of the sealing material 30 by the ultraviolet light is the same as when the ultraviolet light enters from the side of the array substrate 10, which will not be repeated here.

Figure 13:
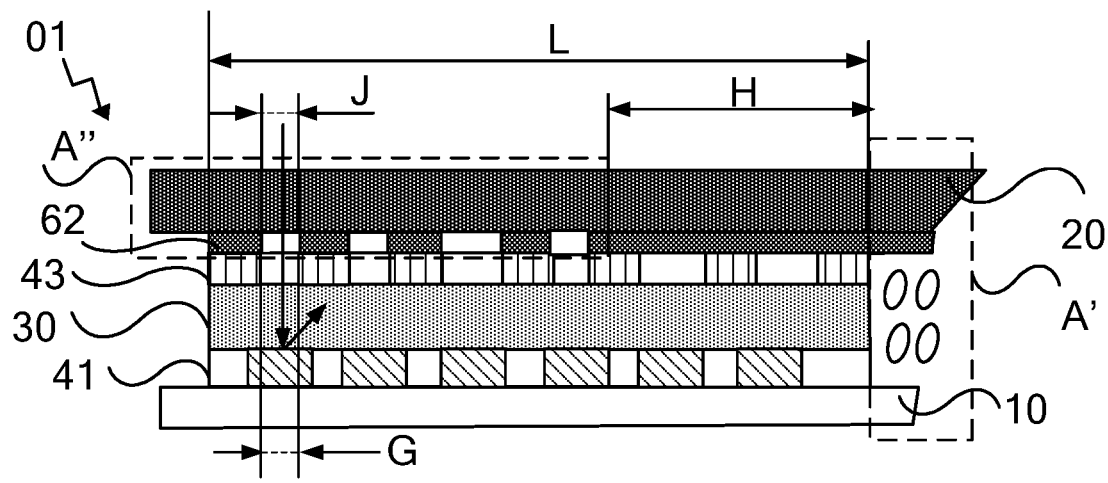
FIG. 13 is another sectional view of the display panel shown in FIG. 1.

On this basis, when the ultraviolet light enters from the side of the opposite substrate 20, since the black matrix 62 (as shown in FIG. 13) is provided in the peripheral area A of the opposite substrate 20, the black matrix 62 will block the ultraviolet light illuminating the sealing material 30. In this case, in order to further increase the ultraviolet light incident on the display panel 01, it is preferable that, as shown in FIG. 13, the black matrix 62 in the peripheral area A and corresponding to the sealing material 30 has a gap defining area A". The distance between the end of the gap defining area A" close to the display area A' and the display area A' is greater than or equal to a predetermined distance H, wherein the predetermined distance H ranges from 30%-35% of the width L of the sealing material 30. The black matrix 62 of the gap defining region A" is in the form of grid. The light-transmitting areas J of the black matrix 62 correspond to the gap areas G of the second reflection portion 43.

It should be noted that the range of the width L of the sealing material 30 is the width in a direction in which the sealing material 30 extends along the array substrate 10.

When the above-mentioned predetermined distance H is less than 30% of the width L of the sealing material 30, the black matrix 62 will have more light-transmitting areas J, thereby reducing the blocking effect of the black matrix 62. When the width of the above-mentioned predetermined distance H is larger than 35% of the width L of the sealing material 30, the black matrix 62 will have less gap areas, thereby reducing the efficiency of curing the sealing material 30 by the incident ultraviolet light when the ultraviolet light enters from the side of the opposite substrate 20. Therefore, preferably, the above-mentioned predetermined distance H is 30% to 35% of the width of the sealing material 30. As such, when the ultraviolet light enters from the side of the opposite substrate 20, both the light blocking effect of the black matrix 62 and the curing efficiency of the sealing material 30 may be ensured.

On this basis, as shown in FIG. 13, when the ultraviolet light enters from the side of the opposite substrate 20, the ultraviolet light is incident through the light-transmitting areas J of the black matrix 62. Since the light-transmitting areas J of the black matrix 62 correspond to the gap areas G of the second reflection portion 43, the ultraviolet light may enter the sealing material 30 through the gap areas G of the second reflection portion 43, being equivalent to increasing the ultraviolet light incident on the sealing material 30 from the side of the substrate 20 when the gap areas J are not provided on the black matrix 62.

Figure 14:
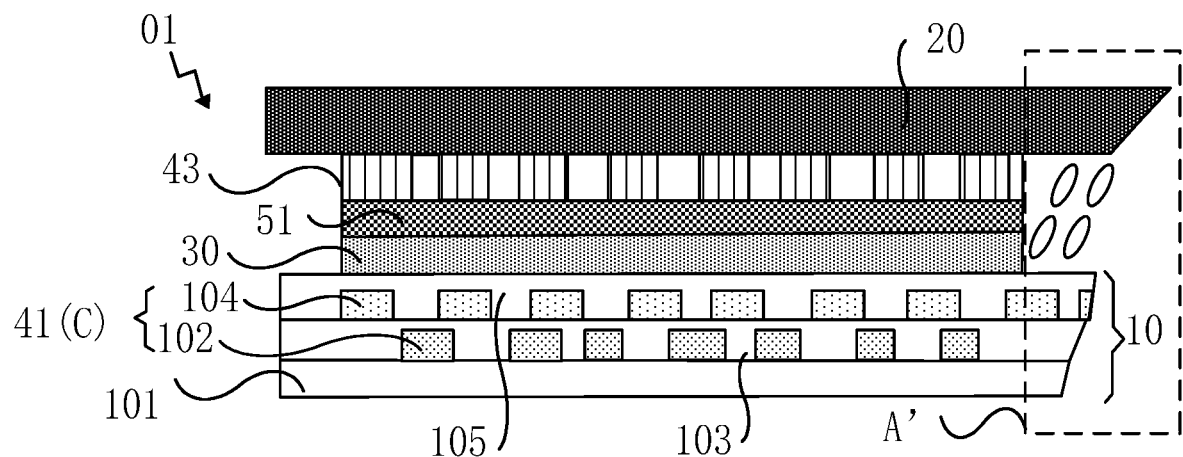
FIG. 14 is another sectional view of the display panel shown in FIG. 1.

Now the specific structures of the first reflection portion 41 and the second reflection portion 43 will be described below by way of example. For example, the array substrate 10 includes a plurality of intercrossing metal leads C in the peripheral region A which form the first reflection portion 41 described above. Specifically, as shown in FIG. 14, the first metal leads 102 and the second metal leads 104 form the above-described plurality of metal leads C. The material forming the second reflection portion 43 includes a metal material. The second insulating layer 51 is provided between the second reflection portion 43 and the sealing material.

The embodiments of the present disclosure provide a display device including the display panel 01 as described above, having the same structure and advantageous effects as the display panel 01 provided in the foregoing embodiments. Since the foregoing embodiments have already provided detailed description to the structure and advantageous effects of the display panel 01, no repeated description will be made here.

The above-mentioned descriptions are merely specific embodiments of the present disclosure. The protection scopes the present disclosure, however, is not limited thereto. Those skilled in the art may easily think of changes and substitutions within the technical scope disclosed by the present disclosure which all shall be covered by the protection scope of the disclosure. Therefore, the protection scope of the present disclosure should be based on the protection scope of the claims.

What is claimed is:

1. A display panel comprising:
an array substrate and an opposite substrate subjected to cell docking, and sealing material provided between the array substrate and the opposite substrate and located in a peripheral area of the display panel, wherein the display panel further comprises an optical part provided on a side of the sealing material close to the array substrate or the opposite substrate and configured to guide ultraviolet light having passed through the sealing material back into the sealing material,
wherein the optical part is provided on a side of the sealing material close to the array substrate, and the array substrate comprises a plurality of intercrossing metal leads in the peripheral area which define a plurality of gap areas, the optical part comprises a first reflection portion which is formed by the metal leads, and a first refraction which is provided between the first reflection portion and the sealing material, the first refraction portion has a first surface with unevenness at a side close to the sealing material, in a position corresponding to the gap areas.

2. The display panel according to claim 1, wherein the optical part has a side contacting the sealing material which is an uneven reflection surface and by which the ultraviolet light having passed through the sealing material is reflected back into the sealing material.

3. The display panel according to claim 1, wherein the reflective surface of the optical part is a diffusely reflective surface.

4. The display panel according to claim 1, wherein the display panel further comprises a first insulating layer between the array substrate and the sealing material, and at least part of the first insulating layer forms the first reflection portion.

5. The display panel according to claim 4, wherein the array substrate comprises a gate line insulating layer and a data line insulating layer, and the first reflection portion is provided in the same layer as the gate line insulating layer or the data line insulating layer.

6. The display panel according to claim 1, wherein the first reflection portion comprises a plurality of intercrossing refractive strips which have overlapping positions corresponding to at least part of the gap areas.

7. The display panel according to claim 1, wherein the first reflection portion comprises a plurality of spaced refraction blocks which have positions corresponding to at least part of the gap areas.

8. The display panel according to claim 1, wherein the optical part is provided at a side of the sealing material close to the opposite substrate, the optical part comprises a second reflection portion, the second reflection portion has an uneven surface close to the sealing material, and the ultraviolet light having passed through the sealing material is reflected back into the sealing material by the second reflection portion.

9. The display panel according to claim 8, wherein the material forming the second reflection portion comprises a metal material.

10. The display panel according to claim 8, wherein the display panel comprises a display area surrounded by the peripheral area,
wherein the opposite substrate comprises a black matrix, the black matrix at the peripheral area and at a position corresponding to the seal material has a gap defining area, and a distance between an end of the gap defining area close to the display area and the display area is greater than or equal to a predetermined distance, wherein the predetermined distance is in range of 30%-35% of width of the sealing material, and wherein the black matrix in the gap defining region is in a grid shape, and the black matrix has a light transmitting areas corresponding to the gap areas of the second reflection portion.

11. A display device comprising the display panel according to claim 1.

12. The display panel according to claim 8, wherein a second insulating layer is provided between the second reflection portion and the sealing material, the second insulating layer has an uneven surface close to the sealing material.

13. The display panel according to claim 1, wherein the optical part comprises a second reflection portion, a second insulating layer is provided between the second reflection portion and the sealing material, the optical part is provided at a side of the sealing material close to the opposite substrate, and comprises a second reflection portion, the second insulating layer has an uneven surface close to the sealing material, the ultraviolet light having passed through the sealing material is reflected back into the sealing material by the second reflection portion.

14. The display panel according to claim 12, wherein a surface of the second insulating layer close to the sealing material is a diffusely reflective surface.

15. A display panel comprising:

an array substrate and an opposite substrate subjected to cell docking, and sealing material provided between the array substrate and the opposite substrate and located in a peripheral area of the display panel, wherein the display panel further comprises an optical part provided on a side of the sealing material close to the array substrate and the opposite substrate and configured to guide ultraviolet light having passed through the sealing material back into the sealing material, wherein the optical part comprises a first reflection portion provided on a side of the array substrate close to the sealing material and a second reflection portion provided on a side of the opposite substrate close to the sealing material, wherein the first reflection portion comprises a plurality of intercrossing first reflective strips, the second reflection portion comprises a plurality of intercrossing second reflective strips which define a plurality of gap areas, and wherein the plurality of first reflective strips have overlapping positions, at least part of which corresponds to at least one gap area defined by the second reflective strips.

16. A display device comprising the display panel according to claim 15.

* * * * *